Jan. 2, 1923.   1,440,513.
A. L. WATERS ET AL.
TURRET ATTACHMENT FOR EDGE AND SHANK TRIMMERS.
FILED NOV. 22, 1920.   2 SHEETS—SHEET 1.

INVENTORS.
A. LOUI WATERS
BY SAMUEL PLAWKER
ATTORNEY.

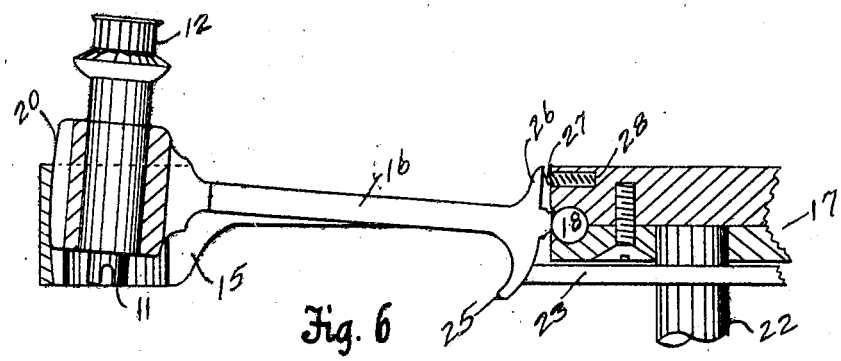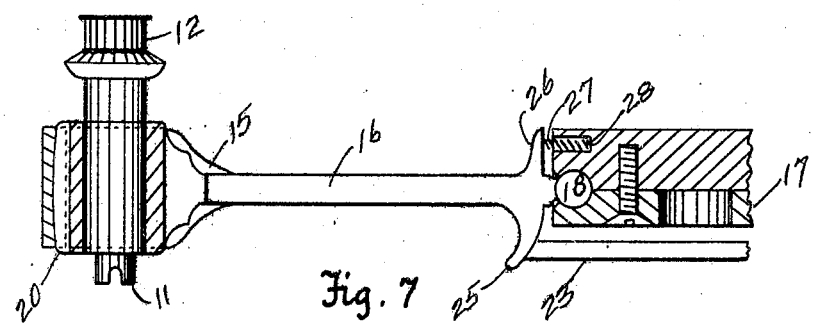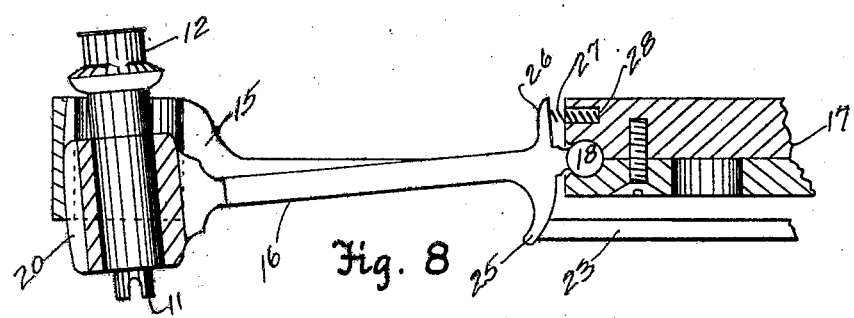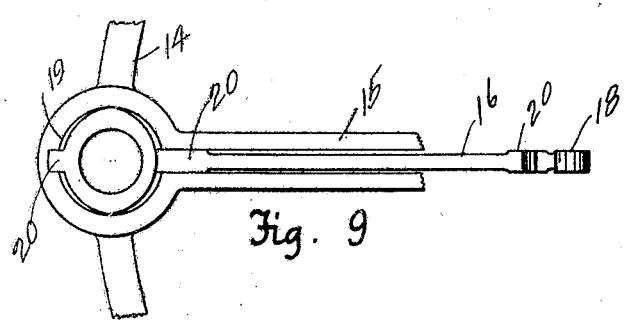

Patented Jan. 2, 1923.

1,440,513

UNITED STATES PATENT OFFICE.

ABRAHAM LOUI WATERS AND SAMUEL PLAWKER, OF WALLA WALLA, WASHINGTON.

TURRET ATTACHMENT FOR EDGE AND SHANK TRIMMERS.

Application filed November 22, 1920. Serial No. 425,732.

*To all whom it may concern:*

Be it known that we, ABRAHAM LOUI WATERS and SAMUEL PLAWKER, both citizens of the United States, residing at Walla Walla, in the county of Walla Walla and State of Washington, have invented certain new and useful Improvements in Turret Attachments for Edge and Shank Trimmers, of which the following is a specification.

This invention relates to shoe repairing machinery and more particularly to edge and shank trimmers, and has for its object to provide a turret attachment whereby a saving of time in changing the wheels of the edge trimmers is accomplished.

A further object is to provide a means whereby a complete set of edge trimmers is constantly within easy reach and positioned in a manner that all trimmers are withdrawn out of the way while the operative trimmer is extended for work.

A further object is to provide a means of the class above mentioned that is applicable to practically all trimmers and that is positioned to avoid the shank trimmer when that part of the trimmer is in operation.

With other objects in view reference is now had to the accompanying drawings in which—

Figure 2:
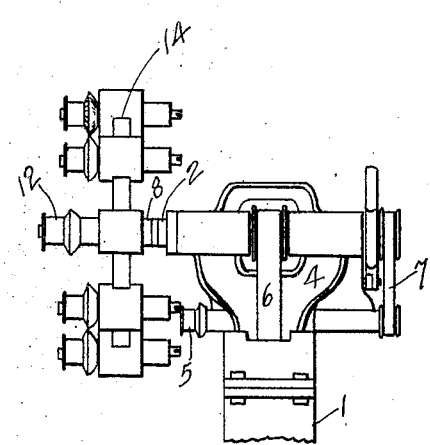
Figure 1:
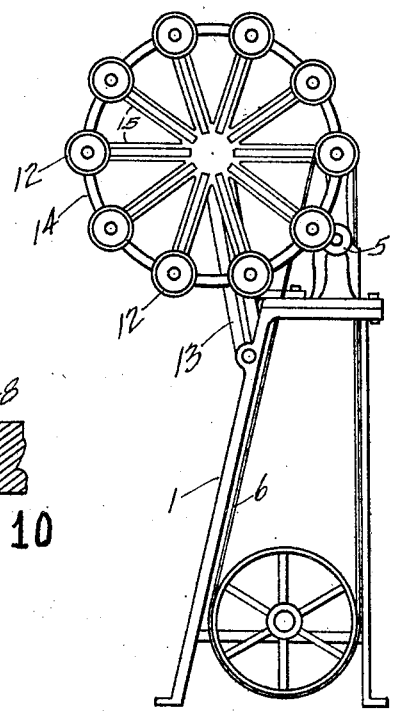
Figure 10:
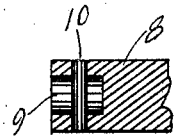
Figure 3:
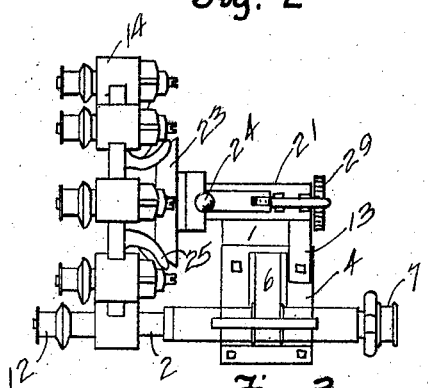
Figure 5:
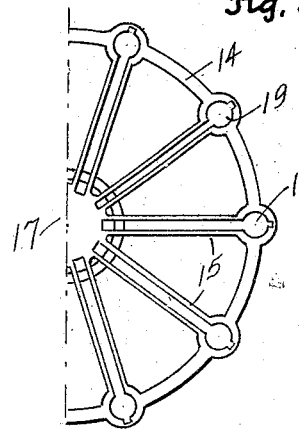
Figure 4:
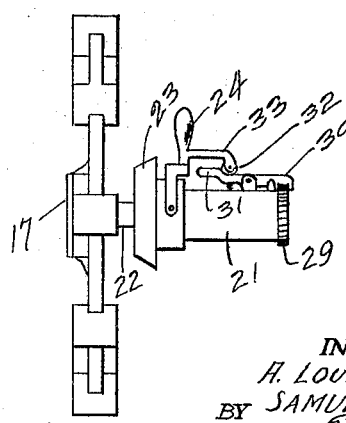

Fig. 1. is a side elevation of an edge and shank trimmer and turret attachment in place;

Fig. 2. shows a front elevation of the head of the trimmer and the turret attachment;

Fig. 3. is a plan view of Fig. 2;

Fig. 4. is a side elevation of the spider showing cone and locking means;

Fig. 5. is a partial front view of the spider and cone;

Fig. 6. is a sectional view of the trimmer arm, and spoke of spider, with trimmer in a position ready for attachment;

Fig. 7. is a similar view to Fig. 6 with trimmer in operative position;

Fig. 8. is a similar view to Fig. 6 with trimmer in inoperative position;

Fig. 9. shows a front view of a part of the spoke with the trimmer arm in place and with the trimmer removed, and Fig. 10. is a sectional view of a portion of chuck which receives the edge trimmer.

Having reference to the drawings like numerals refer to like parts throughout and the numeral 1 refers to the frame of an edge and shank trimmer, in which is mounted a shaft 2 in the journal 3 of the head 4 thereof, and which supports a shank trimmer 5 also mounted in the head.

A belt 6 operates the shaft 2 and this shaft in turn operates the shank trimmer 5 through the medium of the belt 7.

On the end of the shaft 2 is a chuck 8 in which is a recess 9 and pin 10 adapted to receive and engage the slotted shank 11 of the trimmer wheel 12.

Attached to the frame of the machine is a bracket 13 which supports a spider 14, the spokes 15 of which are split to receive the trimmer arms 16. The trimmer arms are hinged in the hub 17 of the spider, the hinge consisting of a pin 18 mounted in the hub 17 which is split as shown in Figs. 6, 7 and 8 for the purpose of assembling.

The outer end of the arm 16 is slidably mounted in the annular opening 19 of the spider and alignment is maintained by the bearing pieces 20.

The bracket 13 consists of a lower portion or foot, not shown, it being deemed unnecessary as this portion merely attaches to the machine proper, and a head 21 which is a journal for the shaft 22 on which is mounted the split hub 17 of the spider 14. Slidably mounted on this journal is a cone 23 which may be operated by the handle 24 against the legs 25 of the trimmer arms 16 and is for the purpose of projecting the outer ends of the trimmmer arms and holding them the desired time in the forward position. A corresponding leg 26 extends forward to engage the spring 27 which is shown conventionally in the recess 28, by which means the outer ends of the trimmer arms are retracted. Any means may be used here as a "stop" to prevent too great a movement of the trimmer arm or obviously the movement of the cone may be regulated to control this movement, if it is deemed advisable.

On the end of the shaft 22 and attached rigidly thereto is a ratchet wheel 29, and mounted on the head 21 is a dog 30 which engages the ratchet wheel and has an offset lever arm 31 to be engaged by the roller bearing 32 in the arm 33 attached to the handle 24.

Mounted in the outer ends of the trimmer arms are the trimmer wheels 12. With the exception of the slotted shank 11 the trimmer wheel is of a standard form and the outer end of the trimmer will be constructed to receive the wheel, thus further description is deemed unnecessary.

In use the turret attachment is fastened to the edge and shank trimmer. The handle 24 is pressed to the left throwing the dog 30 out of engagement with the ratchet wheel 29 by means of the roller bearing 32 which presses down the offset lever arm 31. At the same time the cone 23 raises the leg 25 which throws the arm outward to the position shown in Fig. 6; in this position the slotted shank 11 enters the annular opening 19 which is set to clear the chuck 8 as the spider is rotated. The spider is now rotated to bring the desired trimmer wheel opposite the chuck when the handle 24 is fully withdrawn; this withdrawal action permits the dog to enter the ratchet wheel and lock the spider from further rotation, and with the desired trimmer wheel opposite the chuck the male portion containing the slot enters the female portion of the chuck with the pin 10 therein, entering the slot of the slotted shank 11, thus forming a mechanical union wherewith to operate the trimmer wheel.

The trimmer wheel when in the operable position, see Fig. 7, is in a true horizontal position while in either the projected position or retracted position they are not, this is obvious as the wheels travel in an arc with the trimmer arm. The spring 27 now maintains the union of the trimmer wheel and chuck, the chuck preventing the trimmer wheel from being fully retracted and as the other trimmer wheels, having no obstacle, are fully retracted by the spring, the fully retracted trimmer wheels are out of line of the wheel in operation and thus permits a free movement of the work without interference from the other inoperative wheels.

Having thus described our invention, we claim:

1. In a turret attachment for an edge and shank trimmer, the combination of an attaching bracket a head on said bracket, a spider revolubly mounted in said bracket, trimmer arms hingedly and slidably mounted in the spokes of said spider and provided with projecting legs, a cone slidably mounted on said bracket in engageable relation with said projecting legs, a locking means on said head operable in conjunction with said cone, trimmer wheels rotatably mounted in the outer ends of said trimmer arms, and a chucking means attached to said trimmer to engage and rotate one of said trimmer wheels.

2. In a turret attachment for an edge and shank trimmer, the combination of an attaching bracket, a rotatable spider mounted in said bracket, a multiplicity of trimmer arms movably mounted in said spider, a means for projecting the outer end of the trimmer arms forward, yielding means for retracting said outer ends, trimmer wheels rotatably mounted in said outer ends and slidable therein, a chucking means attached to said trimmer to register with and rotate one of said trimmer wheels, said chucking means maintaining said trimmer wheel projected beyond the retracted trimmer wheels for operation.

3. In a turret attachment for an edge and shank trimmer, the combination of an attaching bracket consisting of a head and foot, a shaft rotatably mounted in said head and carrying a spider, a multiplicity of trimmer arms movably mounted in said spider and provided with projecting legs, a means cooperating with said legs to project said trimmer arms, a yielding means for retracting said trimmer arms, trimmer wheels rotatably mounted in the outer end of said trimmer arms, and movable therewith, and a chucking means attached to said trimmer to engage and rotate one of said trimmer wheels, said chucking means maintaining said trimmer wheel projected for operation beyond the retracted trimmer wheels.

4. In a turret attachment, in combination with an edge and shank trimmer, an attaching bracket consisting of a head and foot, a spider rotatably mounted in said head, said spider consisting of a split hub, slotted spokes attached to said hub, the slots therein terminating in annular openings in the perimeter of said spider, trimmer arms movably mounted in said split hub and operable transversely in the slot of said spokes, and in said annular openings, and provided with projecting legs, trimmer wheels rotatably mounted in said trimmer arms, a means for projecting said trimmer arms in a manner to engage one of said trimmer wheels in an operable position with the operating mechanism, a yielding means for retracting the others of said trimmer wheels out of the range of operation, a means for locking said spider against rotation, and a chucking means attached to said trimmer to engage and rotate one of said trimmer wheels.

In testimony whereof we affix our signatures.

A. LOUI WATERS.
SAMUEL PLAWKER.